(12) United States Patent
Szilagyi et al.

(10) Patent No.: US 10,439,943 B2
(45) Date of Patent: Oct. 8, 2019

(54) ADAPTIVE AND DYNAMIC QUALITY OF SERVICE/QUALITY OF EXPERIENCE ENFORCEMENT

(71) Applicant: Nokia Technologies Oy, Espoo (FI)

(72) Inventors: Peter Szilagyi, Budapest (HU); Csaba Vulkan, Budapest (HU)

(73) Assignee: Nokia Technnologies Oy, Espoo (FI)

( * ) Notice: Subject to any disclaimer, the term of this patent is extended or adjusted under 35 U.S.C. 154(b) by 92 days.

(21) Appl. No.: 15/450,930

(22) Filed: Mar. 6, 2017

(65) Prior Publication Data

US 2018/0026896 A1 Jan. 25, 2018

Related U.S. Application Data

(60) Provisional application No. 62/310,523, filed on Mar. 13, 2016.

(51) Int. Cl.
*H04L 12/851* (2013.01)
*H04L 12/825* (2013.01)
*H04L 12/801* (2013.01)
*H04W 28/02* (2009.01)
*H04L 12/861* (2013.01)

(52) U.S. Cl.
CPC .............. *H04L 47/24* (2013.01); *H04L 47/25* (2013.01); *H04W 28/0268* (2013.01); *H04L 47/11* (2013.01); *H04L 49/90* (2013.01)

(58) Field of Classification Search
CPC ......... H04L 47/24; H04L 47/25; H04L 47/11; H04L 49/90; H04W 28/0268
See application file for complete search history.

(56) References Cited

U.S. PATENT DOCUMENTS

| 2002/0089929 | A1* | 7/2002 | Tallegas | H04L 45/00 370/230 |
| 2002/0174430 | A1* | 11/2002 | Ellis | G11B 27/005 725/46 |
| 2003/0053482 | A1* | 3/2003 | Li | H04L 1/0002 370/465 |
| 2004/0066763 | A1* | 4/2004 | Hashimoto | H04L 29/06 370/329 |
| 2005/0105604 | A1* | 5/2005 | Ito | H04L 29/06027 375/225 |
| 2007/0171849 | A1* | 7/2007 | Zhang | H04L 1/0026 370/310 |

(Continued)

FOREIGN PATENT DOCUMENTS

WO  WO-2014110410 A1  7/2014
WO  WO-2014173466 A1  10/2014

*Primary Examiner* — Jenee Holland
(74) *Attorney, Agent, or Firm* — Mintz Levin Cohn Ferris Glovsky and Popeo, P.C.

(57) ABSTRACT

An apparatus is provided for the adaptive and dynamic enforcement of quality of service or quality of experience. The apparatus may be caused to monitor user plane traffic for the start of an application session, instantiate a buffer for an application session, configure at least one service parameter in the buffer with a quality of service or quality of experience parameter, and correlate uplink and downlink user plane traffic to enforce scheduling in accordance with the quality of service or quality of experience parameter. A corresponding method and non-transitory computer readable storage medium are also provided.

16 Claims, 12 Drawing Sheets

(56) References Cited

U.S. PATENT DOCUMENTS

| | | | |
|---|---|---|---|
| 2008/0191816 A1* | 8/2008 | Balachandran | H04L 47/10 333/24 R |
| 2008/0192710 A1* | 8/2008 | Balachandran | H04L 47/10 370/338 |
| 2010/0220648 A1* | 9/2010 | Persson | H04L 47/10 370/328 |
| 2011/0216648 A1* | 9/2011 | Mehrotra | H04L 47/30 370/230 |
| 2012/0008641 A1* | 1/2012 | Stoica | H04L 47/225 370/465 |
| 2012/0151009 A1* | 6/2012 | Bouazizi | H04L 41/5067 709/219 |
| 2012/0213072 A1 | 8/2012 | Kotecha et al. | |
| 2013/0304796 A1* | 11/2013 | Jackowski | H04L 47/19 709/202 |
| 2013/0332623 A1* | 12/2013 | Gahm | H04L 65/4092 709/234 |
| 2014/0269269 A1* | 9/2014 | Kovvali | H04W 24/08 370/229 |
| 2014/0369195 A1* | 12/2014 | Marchenko | H04L 47/25 370/235 |
| 2015/0043336 A1* | 2/2015 | Zhu | H04W 28/0268 370/230 |
| 2015/0074683 A1* | 3/2015 | Singh | H04L 47/11 719/312 |
| 2015/0215359 A1* | 7/2015 | Bao | H04L 65/605 709/219 |
| 2015/0334596 A1* | 11/2015 | Szilagyi | H04W 28/0289 370/232 |
| 2017/0177222 A1* | 6/2017 | Singh | G06F 3/061 |
| 2017/0230292 A1* | 8/2017 | Lau | H04L 47/12 |
| 2017/0373802 A1* | 12/2017 | Bergstrom | H04L 1/1812 |

* cited by examiner

ADAPTIVE AND DYNAMIC QUALITY OF SERVICE/QUALITY OF EXPERIENCE ENFORCEMENT

FIELD

The subject matter disclosed herein relates to wireless communications.

BACKGROUND

Networks use quality of service (QoS) parameters to ensure that certain traffic types are handled in a certain way to provide a threshold QoS. For example, a given traffic flow may be classified by certain, generally static QoS parameters, such as guaranteed bit rate (GBR), non-guaranteed bit rate (non-GBR), priority handling, packet delay budget, packet error loss rate, and/or the like. When a traffic flow has a certain QoS parameter, it may for example be forwarded via a radio bearer that can carry traffic according to the QoS parameter. Quality of Experience (QoE) represents a measure or indication of quality from the perspective of a user. As such, QoE may take into account the overall application layer performance of traffic between an application at a user equipment to a remote, network server.

SUMMARY

Methods and apparatus, including computer program products, are provided for a dynamic and adaptive application scheduler.

In one aspect there is provided an apparatus. The apparatus may include an application scheduler configured to monitor user plane traffic for a start of an application session, instantiate a buffer for a detected application session, and configure at least one service parameter at the buffer in accordance with a quality of service parameter and/or a quality of experience parameter.

In some example embodiments, one of more variations may be made as well as described in the detailed description below and/or as described in the following features. The buffer may provide additional buffering for a detected bottleneck at another network node. The application scheduler may provide congestion control by increasing or decreasing a rate of a scheduler comprising the buffer. The increase may correspond to an additive increase. The decrease may correspond to a multiplicative decrease. The application scheduler may correlate uplink and downlink user plane traffic to enforce scheduling at the buffer in accordance with the quality of service parameter and/or the quality of experience parameter.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
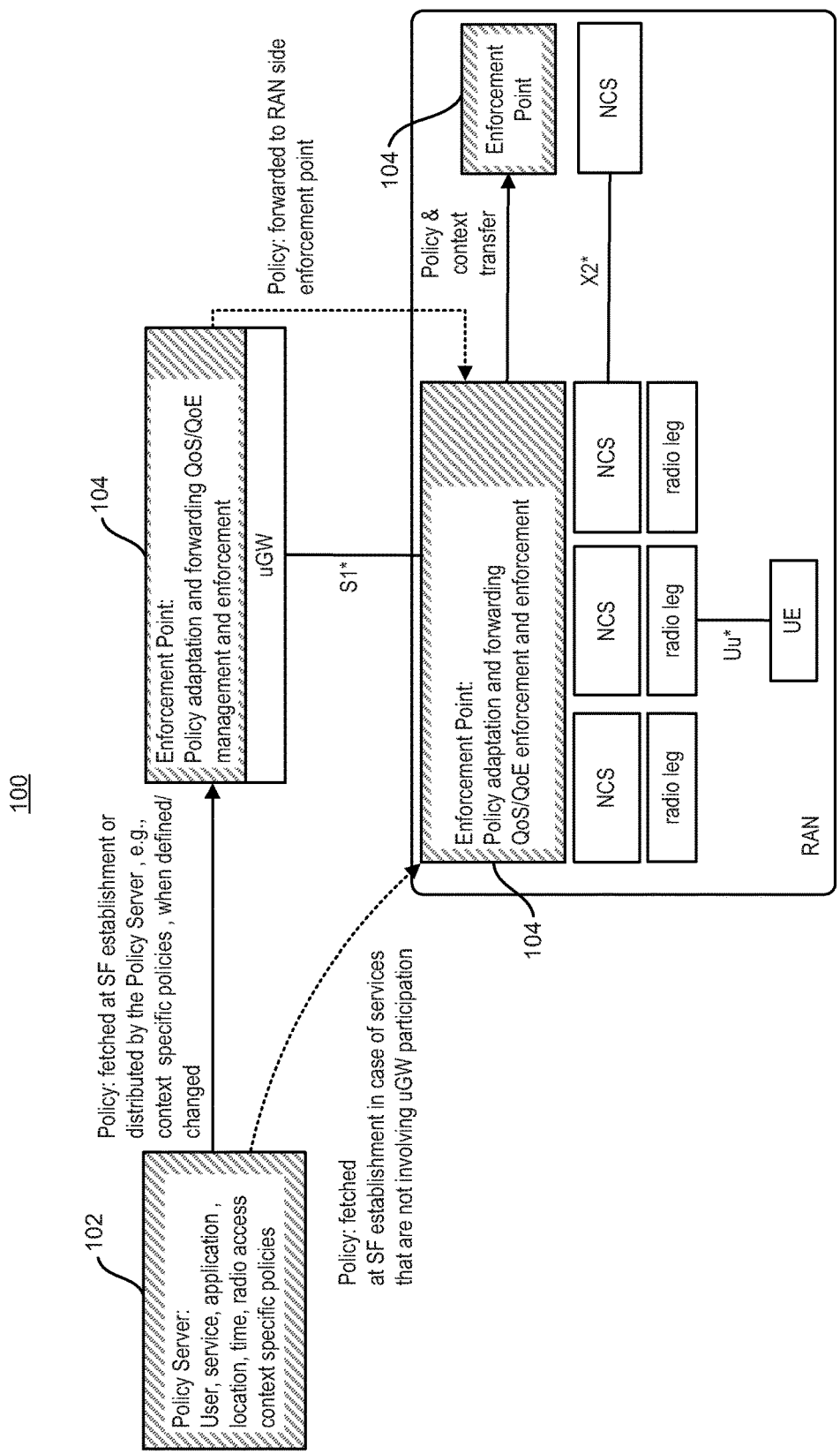
FIG. 1 depicts an example of a QoE architecture, in accordance with some example embodiments.

Like labels are used to refer to same or similar items in the drawings.

DETAILED DESCRIPTION

The subject matter disclosed herein relates to quality of service (QoS) and/or Quality of Experience (QoE) in wireless networking including the 5G QoS/QoE system. Although some of the examples described herein refer to 5G wireless systems, the example embodiments disclosed herein may be implemented in other types of wireless networks as well.

FIG. 1 depicts a block diagram of portions of a QoS/QoE framework, such as system 100. The system 100 may include a central policy server 102 and at least one enforcement point 104. The central policy server 102 may store policies associated with applications, services, and/or the like which may be implemented at a user equipment as well as application or services which may be implemented at other network nodes. Specifically, the central policy server 102 may store, for a given application or service, context (for example, location of the user equipment, time, radio access, and/or the like), specific policies, and/or operator preferences. The enforcement point 104 may manage QoS/QoE by at least dynamically applying or enforcing the policies in the context of actual user plane traffic, services, applications, network status, and/or network resource status. The enforcement point may need access to user plane traffic for collecting user, service, application, network-specific insight information, executing actions on the traffic itself, and/or controlling user plane system resources including so-called critical user plane system resources, such as radio and core network elements, transport infrastructure, and services that can be either physical or virtual ones.

The enforcement point 104 may determine or derive its actions from policies received (or retrieved) from the policy server 102, when a service flow for a given application or service is established. On the user-plane (U-plane), the enforcement point may handle the traffic of one or more service flows and may manage the QoE for each service flow. For efficient QoS/QoE management, the enforcement point may partition the user-plane flows within a service flow into sub-service flows (SSF). A sub-service flow may correspond to one service flow, and the sub-service flow may represent a logical separation carrying a subset of the sub-service flow's traffic that requires dedicated QoS/QoE treatment.

Figure 2:
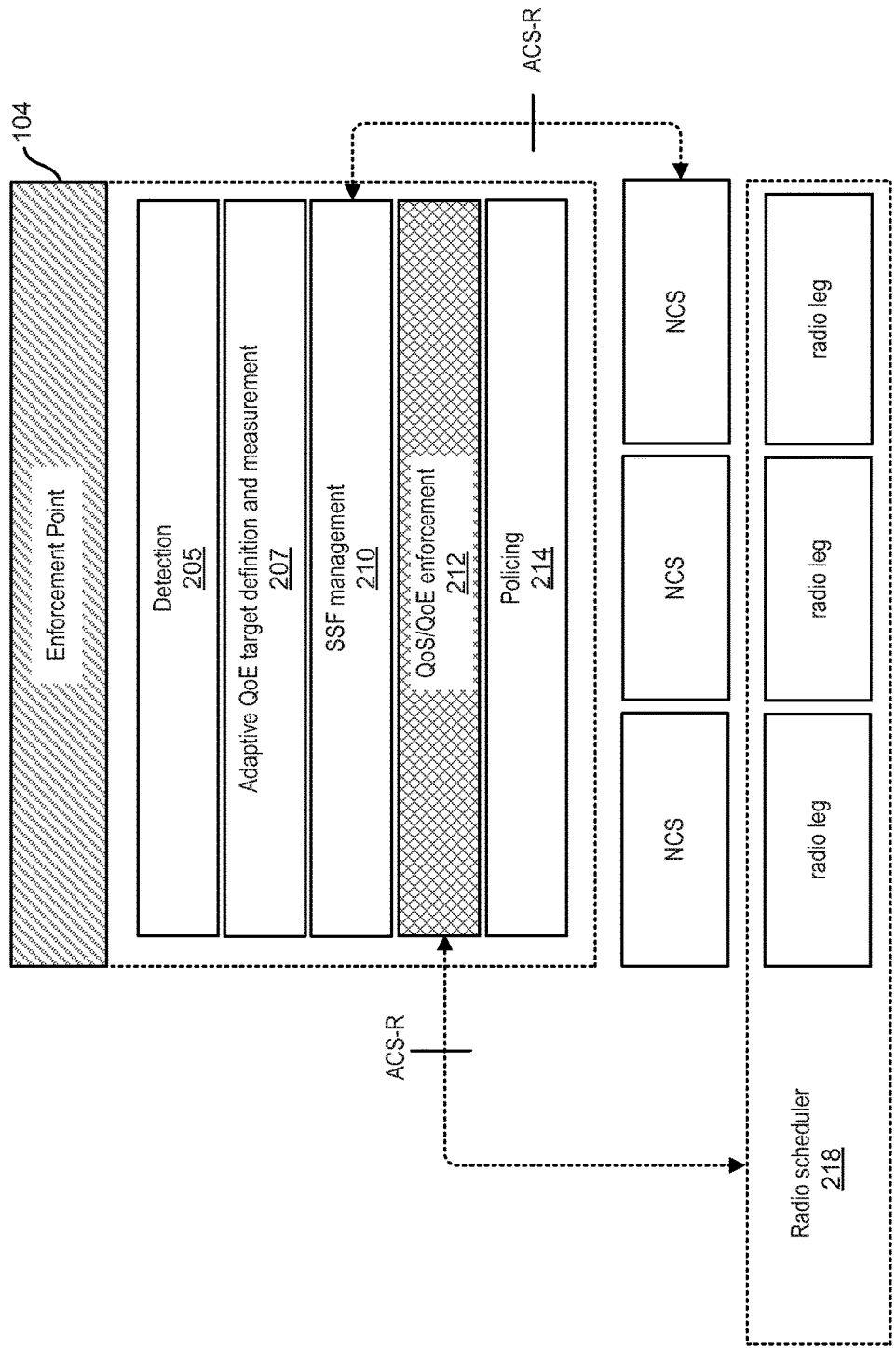
FIG. 2 depicts an example enforcement point, in accordance with some example embodiments.

The enforcement point 102 may include various closely related internal components, such as functions 205-214, for QoS/QoE management as depicted at FIG. 2, which depicts enforcement point 104, in accordance with some example embodiments.

The detection function 205 may be configured to identify user traffic that according to the policies is the subject of QoS/QoE management. Adaptive QoE target definition and measurement function 207 may dynamically identify the set of applicable QoS/QoE parameters and their target values for each application or service, such as an over the top (OTT) application session. Sub-service flow (SSF) management 210 interfaces (via for example, ACS-R) with the radio stack (depicted for example as the NCS (network convergence sub-layer of L2) for each radio leg) may be provided to enable establishment of the sub-service flows and dynamically configure their service parameters in the radio functions (for example, via a radio scheduler 218 or radio resource manager (RRM) or other type of scheduler) to support the QoS/QoE management of the enforcement point. The QoE enforcement function 212 may include internal traffic management actions with the scope of enforcing the QoS/QoE targets with respect to quality. Policing 214 may enable enforcement of non-QoE related limits and service boundaries.

User-plane QoS, resource management, and scheduler functions (for example, radio scheduler, transport DiffServ schedulers, and the like) have traditionally provided service (for example, grant air time, radio resources, link access, and the like) to individual packets based on simple per QoS class parameters. For each QoS class, there may be a corresponding packet queue or buffer to which parameters are mapped. However, these user-plane QoS, resource management, and scheduler functions are relatively static. For example, the granularity of service differentiation may be relatively static as packets are classified into a set of queues according to pre-configured criteria for a service. As traditional resource management mechanisms operate at the packet level according to relatively static QoS parameters, traditional resource management mechanisms may not be considered a suitable fit to perform intelligent policy based QoE enforcement.

In some example embodiments, there may be provided an application scheduler. The application scheduler may provide an additional layer of QoS/QoE enforcement and resource management. This additional layer may be used in addition, such as on top of, traditional or existing packet level mechanisms. The additional layer may be configured to understand the user-plane traffic on a higher abstraction level and enforce application specific QoE targets and autonomously defined QoS/QoE rules on a dynamically identified traffic mix. The additional layer may be configured to have the capability of interworking with traditional packet schedulers to enhance or maximize the efficiency of QoS/QoE management.

In some example embodiments, the application scheduler may be a dynamic, self-adaptive, policy-based scheduler configured to operate at the per-user and per-application session level, with traffic multiplexing granularity.

In some example embodiments, the application scheduler may provide QoE and/or QoS enforcement. For example, user plane mechanisms may be configured to act on the traffic according to high-level application specific goals (such as customer experience targets) and/or network and/or packet level QoS parameters. Both operations may be dynamic and self-adaptive (for example, QoS may be enforced based on actual traffic and/or network context, while QoE enforcement may be more dynamic due to the versatile application session attributes and resource requirements). The QoE enforcement and dynamic QoS enforcement capabilities may be considered unique to the application scheduler disclose herein.

In some example embodiments, the application scheduler may provide efficient congestion control. The congestion control may be integrated into the QoS/QoE enforcement mechanisms (for example, congestion may be resolved in combination with QoS/QoE enforcement).

In some example embodiments, QoE and QoS enforcement may be performed for both the uplink (UL) and downlink (DL) in a correlated manner. Rather than treating the uplink (UL) and downlink (DL) traffic separately (using for example different entities that are not exchanging information), the application scheduler may take into account both the uplink (UL) and downlink (DL) when performing QoE and QoS enforcement.

In some example embodiments, QoS and QoE enforcement may have selectable, based on the scope of the policies, modes of operation. The application scheduler may control (for example, take over responsibility for) resource management from congested resources to effectively pull the congestion point from an external bottleneck into the application scheduler's internal scheduler where the resource bottleneck may be resolved by for example redistributing available resources among competing flows and applications according to QoE requirements or the QoS principles selected by the policies. Congestion control may thus be incorporated into both QoS and QoE enforcement, which may be an integral and/or inseparable capability.

Figure 3A:
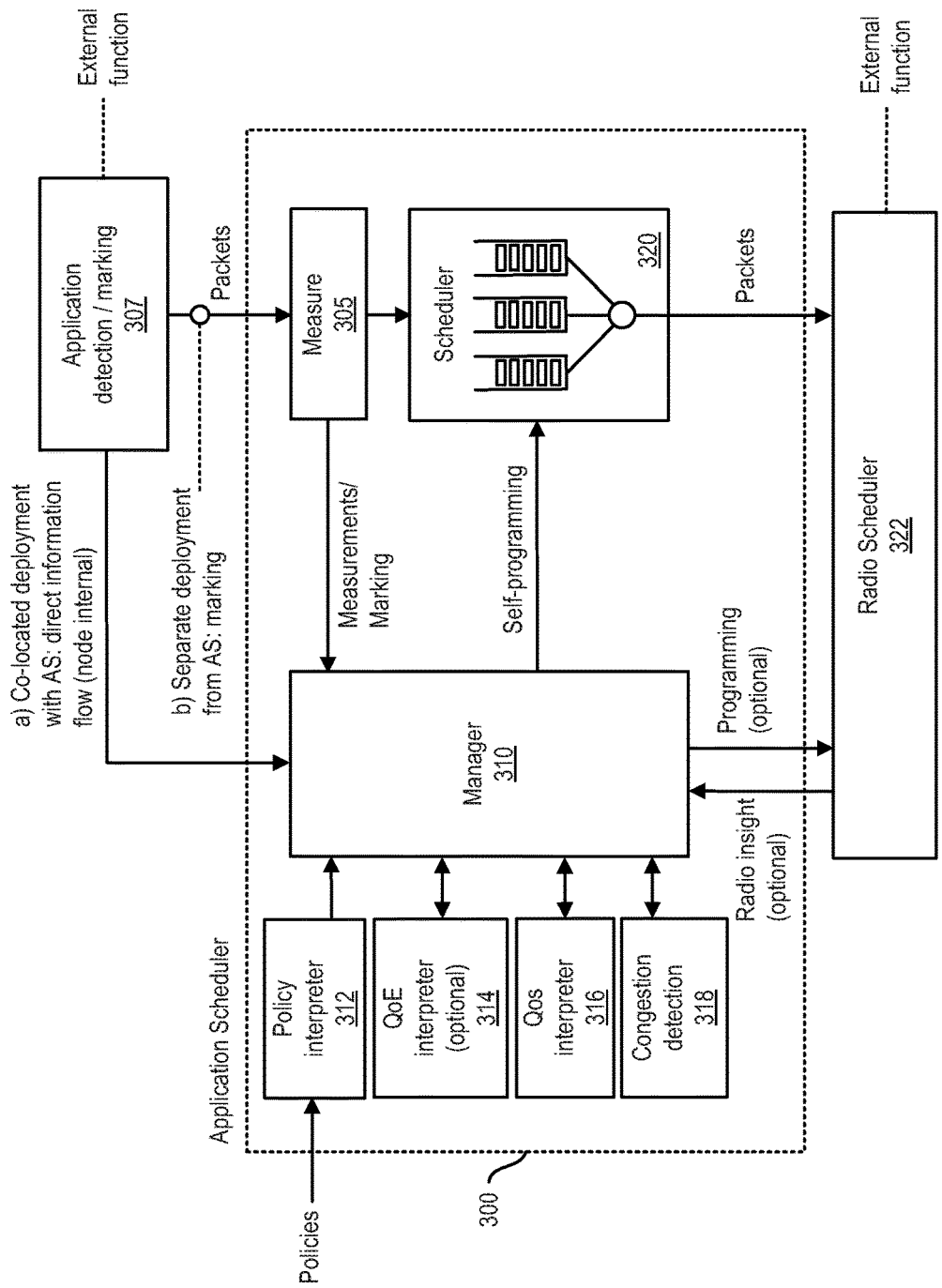
FIG. 3A depicts an application scheduler, in accordance with some example embodiments.

FIG. 3A depicts an example of an implementation of the application scheduler 300, in accordance with some example embodiments. The application scheduler 300 may include at least one processor and at least one memory configured to provide one or more of the following function or components: a policy interpreter 312, a QoE interpreter 314, a QoS interpreter 316, a congestion detection 318, a manager 310, a scheduler 320, and/or a measure 305.

The application scheduler 300 may support a variety of QoS/QoE enforcement alternatives, such as QoS management only, QoE management only, or a combination thereof (for example, a mixed QoE and QoS management in which the scope of traffic management, QoS or QoE enforcement, can be defined on per service flow or per service vertical such as for an application at a device such as a user equipment, an over the top application, machine-to-machine application, a vehicle-to-vehicle application or service, or vehicle-to-infrastructure application or service and/or the like).

The application scheduler 300 may provide QoE enforcement by way of application session or service connection level enforcement of QoE specific parameters, such as seamless multimedia playback or low web page download time. The application scheduler 300 may provide enhanced QoS enforcement where both low-level traditional QoS key performance indicators (KPIs) and additional application level key performance indicators are enforced on per application session level (rather than solely on packet level enforcement of just QoS key performance indicators). As such, the application scheduler's 300 QoE enforcement may include QoS enforcement too.

In some example embodiments, the application scheduler's QoE enforcement may be a stateful function in the sense that it acts on application specific context, a history of measurements/events, and/or predictions (in contrast to QoS enforcement which is mostly a memoryless process that operates according to the current/latest context and on the next packets available for transmission). QoE enforcement may exercise self-monitoring to evaluate if the actions performed by the application scheduler 300 have reached the desired outcome or if the actions performed by the application scheduler 300 require update (in contrast QoS enforcement usually executes the same pre-configured program without considering the history and impact of the actions). QoE enforcement may be able to enforce explicit per application session bandwidth targets (derived from the needs of the specific session), rather than the more static QoS architectures usually provide per class relative prioritization for non-real time traffic. The application scheduler's 300 QoS enforcement may also provide network level parameter enforcement such as fairness, latency/delay/bandwidth targets, relative prioritization, urgency, protocol level (for example, TCP/QUIC) optimization or healthiness, and/or the like, without considering application specific parameters.

In some example embodiments, application detection 307 (which may be required for QoE/QoS management) may be performed by an entity external to the application scheduler 300. The application detection 307 may mark packets in order to generate detection results. Application detection 307 may generate detection results, which may be sent (or otherwise provided or conveyed to) the application scheduler 300. Alternatively or additionally, the application detection 307 component may be co-located with the application scheduler 300 (for example, application detection 307 and application scheduler 300 may both be deployed or implemented on the same radio access network (RAN) or core node, with internal information exchange capabilities). When that is the case, the detection result may be made directly available to the application scheduler 300, which may reduce or eliminate the need for a dedicated signaling interface to carry the detection result. Alternatively or additionally, application detection 307 may be deployed separately from the application scheduler 300 (for example, the application scheduler 300 may be located in the radio access network while the application detection 307 may be is located in a core network). When that is the case, conveying the detection result from the application detection 307 component to the application scheduler 300 may be performed via an interface, such as via in-band packet marking.

The application scheduler 300 may include a measure component 305. The measure component may perform the collection of relevant measurement data required for operation of the application scheduler. The measure component 305 may be configured as a user-plane packet monitoring function capable of collecting measurements from a packet, a flow, an application, a network, QoS/QoE, and/or content metadata. The collected measurements may be sent to (or made accessible for by) the manager component 305. If application detection 307 is deployed separately from the application scheduler 300, the measure component 305 may relay any corresponding in-band marking (if any) to the manager component 310. The uplink (UL) and downlink (DL) measurements may be kept consistently to enable coherent UL and DL QoS/QoE enforcement.

The application scheduler 300 may include a policy interpreter component 312. The policy interpreter component 312 may be configured to compile the policies to the context of the currently active application sessions or flows. The interpreted policies may be consumed by the manager 310.

The application scheduler 300 may include QoS/QoE interpreters 314/316. These interpreters may be configured to evaluate the QoS/QoE measurements and define the appropriate service for applications and service verticals. The resulting parameters may be utilized by the manager 310.

The application scheduler 300 may include a congestion detection component 318. The congestion detection component 318 may be configured to detect fully utilized resource bottlenecks in the system. The detection may be sent to manager 310, so that it may trigger/configure scheduler actions in order to enforce the QoS/QoE within the existing system resource limitations.

As noted, the application scheduler 300 may include manager 310. Manager 310 may be configured to perform analytics and decision entity. The manager 310 may correlate the policies (received from the policy interpreter), application detection (external input), measurements (obtained from the Measure component), QoS/QoE requirements (obtained from the QoS/QoE interpreter components) and congestion (obtained from congestion detection). By analyzing the inputs, manager 310 may profile the resources available in the system and dynamically programs the scheduler 320 infrastructure to perform congestion control and enforce the required QoS/QoE. Through its operation, manager 300 may correlate uplink and downlink measurements, and the manager 310 may initiate actions affecting both uplink and downlink directions. The manager 310 may autonomously recognize whether a policy needs to be activated (for example, the corresponding traffic has appeared or the policy context such as radio access network congestion is detected).

The application scheduler 300 may include a scheduler 320. The scheduler 320 may be configured to provide a dynamic and flexible internal packet scheduler infrastructure with a programmable per buffer service. The scheduler 320 may be programmed and/or parameterized by the manager 300. The scheduler may couple the downlink and uplink QoE/QoS management and enforcement.

The application scheduler 300 may include, or be coupled to, a radio scheduler 322. The radio scheduler 322 may be configured to obtain support for congestion detection and resource availability detection through direct radio insight. In some example embodiments, an interface between the radio scheduler 322 and the application scheduler 300 may be provided, and this interface may be used to provide radio leg level resource utilization and/or per radio buffer status/channel quality information.

The application scheduler 300 may also configure (for example, program) the radio scheduler's 322 internal parameters so that it supports the execution of its own QoS/QoE program. This may be enabled by two interfaces. The first interface may enable control or programming from the manager component 310 to the radio scheduler 322 to enable configuration of scheduler parameters at the radio. The second interface (which may be on the user-plane) may be used so that the application scheduler can mark packets going towards the radio scheduler 322 to help the radio scheduler 322 differentiate among flows that require special/differentiated treatment.

Figure 3B:
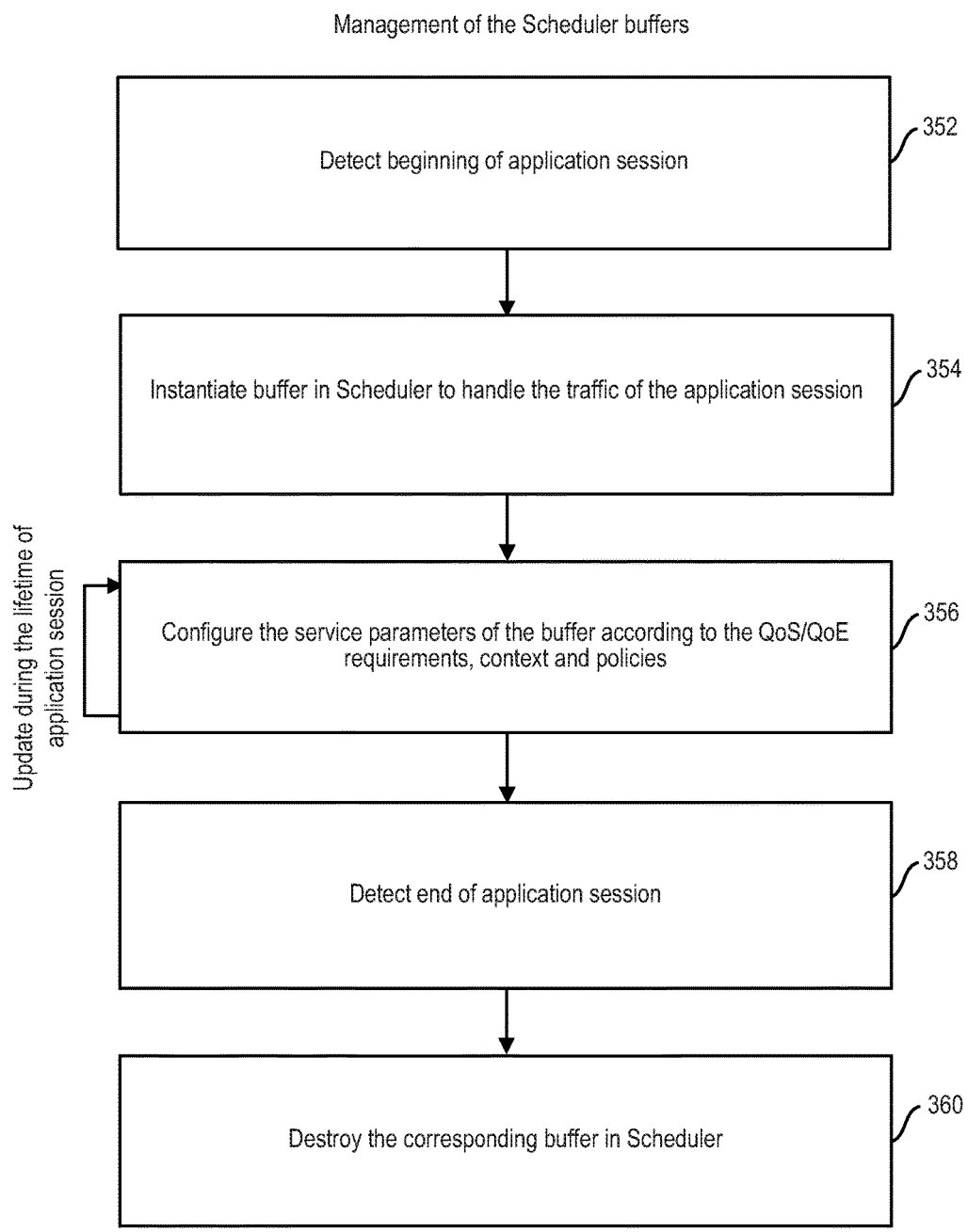
FIG. 3B depicts a flow chart for managing buffers, in accordance with some example embodiments.

FIG. 3B depicts an example of a flow chart for managing the buffers in scheduler 320. The description of FIG. 3B refers to FIG. 3A as well.

At 352, the application scheduler 300 may detect the beginning of a session, such as an application session and/or the like. At 354, the application scheduler 300 may instantiate a buffer in scheduler 320. At 356, the application scheduler 300 may configure service parameters for the buffer at scheduler 320. The service parameters may be configured based on QoS requirements and/or QoE requirements (which may be obtained from a policy server or may be derived automatically and autonomously by the application scheduler) as well as context information and/or policy information. The application scheduler 320 may update the service parameters of the buffer during the lifetime of the session. At 358, the application scheduler 300 may detect the end of the application session, and then terminate at 360 (for example, destroy, remove, and/or the like) the buffer in scheduler 320.

Figure 3C:
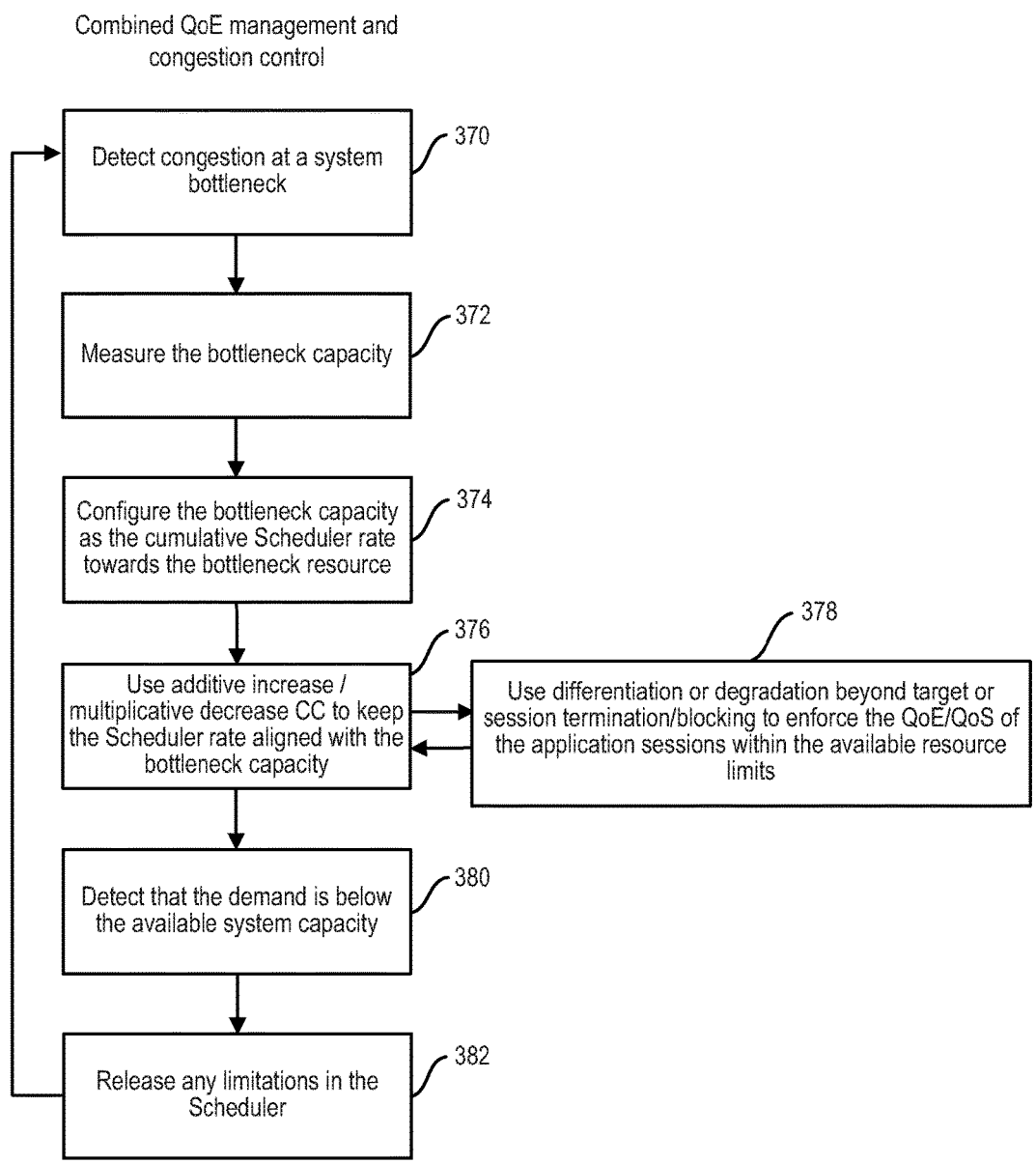
FIG. 3C depicts a flow chart for QoE management and congestion control, in accordance with some example embodiments.

FIG. 3C depicts an example of a flow chart for combining QoE management and congestion control. The description of FIG. 3C refers to FIG. 3A as well.

At 370, the application scheduler 300 may detect a system bottleneck. For example, an interface or radio bearer/link may be detected as a bottleneck. At 372, the application scheduler 300 may measure or otherwise determine the capacity the detected bottleneck. For example, the capacity of an interface or bottleneck may represent an allowed or allocated capacity in for example bits per second. At 374, the application scheduler 300 may configure or adjust the bottleneck capacity as a cumulative scheduler 320 rate towards the bottleneck resource. At 376, the application scheduler 300 may apply congestion control to increase (for example, additively increase) or decrease (for example, multiplicatively decrease) the scheduler's 320 rate to keep it aligned with the bottleneck's capacity. At 378, to enforce the QoE/QoS of the application sessions within the available resource limits, the application scheduler 300 may use differentiation between application sessions or (provided that not all application session targets may be fulfilled through differentiation) allowing degradation of selected application sessions beyond their target and/or terminate/block selected application sessions. At 380, the application scheduler may detect that the demand is below an available capacity for the system. At 382, the application scheduler may release any limitations on the scheduler 382.

Figure 4:
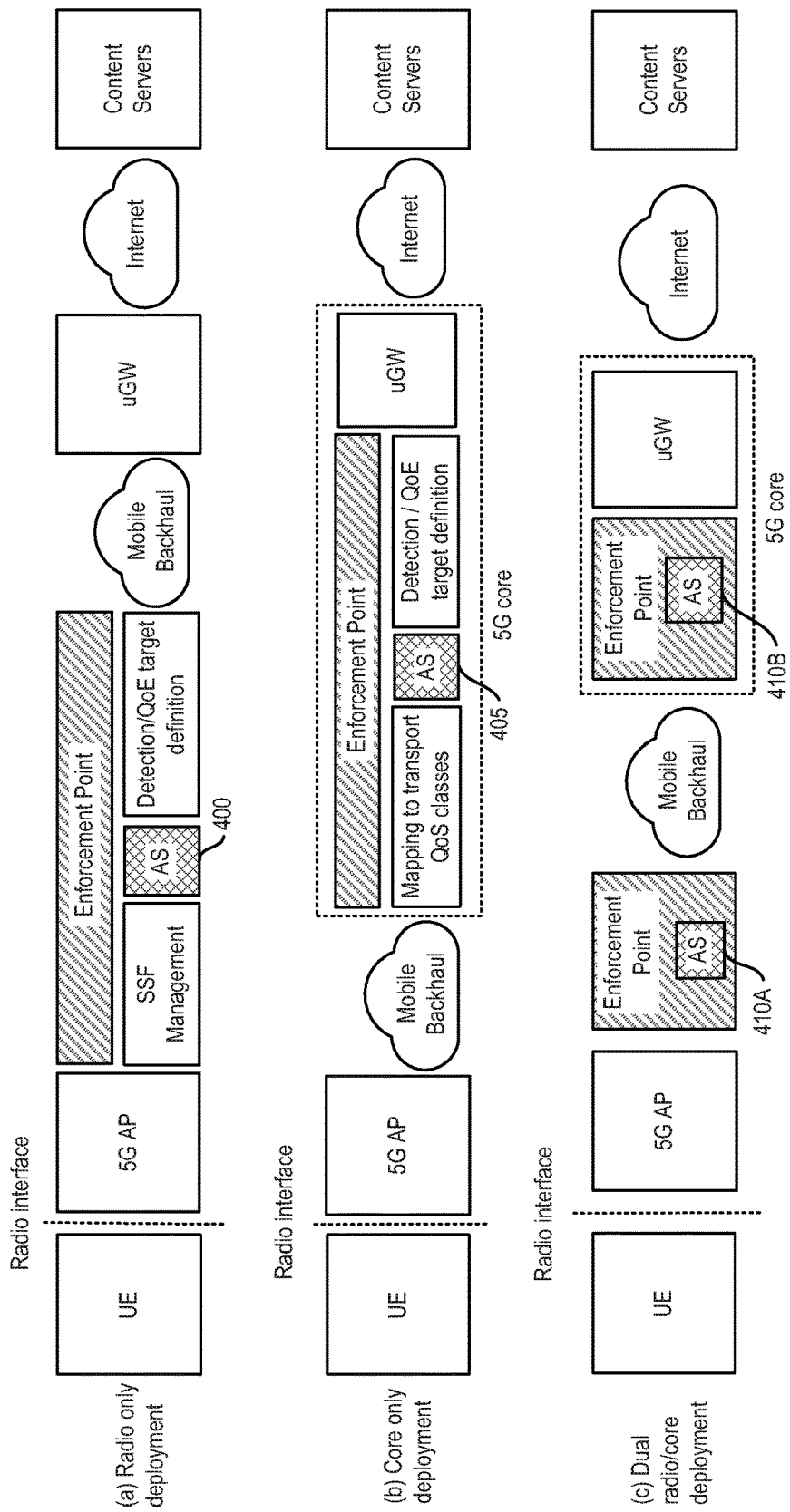
FIG. 4 depicts examples of deployment configurations of the application scheduler, in accordance with some example embodiments.

The application scheduler may be deployed at the radio side 400, at the core network side 405, or a combination of both 410A-B to provide access to the user plane as shown at FIG. 4. The application scheduler 400 may be able to most efficiently manage resources that are located downstream from its deployment point. For example, a radio side application scheduler 400 may be able to manage a single radio leg, such as a 5G wireless link(s) (also referred to as a radio leg), or a cluster of access points, such as 5G access points. While the core side application scheduler 405 may be better able to manage both radio and transport resources. In case of a dual deployment, the radio resources may be handled by the radio application scheduler 410A, and the core side application scheduler 410B may handle transport network resources.

The application scheduler may be able to enforce QoS/QoE policies at the aggregation level it handles the traffic. For example, the application scheduler may handle the traffic of a 5G access point, in which case the application scheduler manages the aggregated traffic served by the 5G access point, and the application scheduler may be able to enforce policies at the level of the 5G access point. Network wide policy enforcement (such as enforcing fairness or balance traffic according to any criteria among RATs) may dictate the application scheduler to be located at the core as shown by application scheduler 405. The radio side application scheduler 410A may still enforce the same kind of policies, but only among a cluster of access points or among the radio legs of a single access points depending on a given deployment or implementation.

In some example embodiments, the radio side application scheduler 400 and the radio scheduler 322 may be implemented in separate devices, so that the application scheduler functions may more effectively support both QoE and QoS mode of operations without depending on the specific implementation details of the radio scheduler. However, the radio side application scheduler 400 may also be collapsed with the radio scheduler 322 to create a dynamic, context based adaptive QoS enforcement point. In that case, the radio scheduler may become the only mechanism that is able to differentiate traffic flows and applications. As such, the differentiation capability might be limited to the capabilities of the radio scheduler. These capabilities may be packet level QoS enforcement mechanisms, without support for QoE level operation. As such, when the application scheduler is merged with the radio scheduler, the application scheduler may run in a QoS mode only, using full radio insight for congestion detection and resource profiling and using the radio scheduler as an enforcement infrastructure (for example, the radio scheduler's internal Scheduler component is not active/present).

At FIG. 4, the enforcement point may obtain QoS/QoE management policies during service flow establishment. These policies may identify the level of QoS/QoE management (for example, full application insight and context based QoE management, application agnostic context based QoS management, policing to enforce individual limits, and/or the like), the context in which the policies are valid (for example, in case of congestion, during specific time/location, etc.), the traffic that is subject to the policies (for example, specific applications, service verticals, users, protocols), the way to perform management/actions (for example, full application insight based QoE management, application aware transport/lower layer protocol optimization, application agnostic protocol optimization, etc.) and/or explicit QoE/QoS parameters and target values to be enforced. As the application scheduler 300 may be an internal component of the enforcement point, the application scheduler 300 may be aware of the policies and operates according to them.

Figure 5:
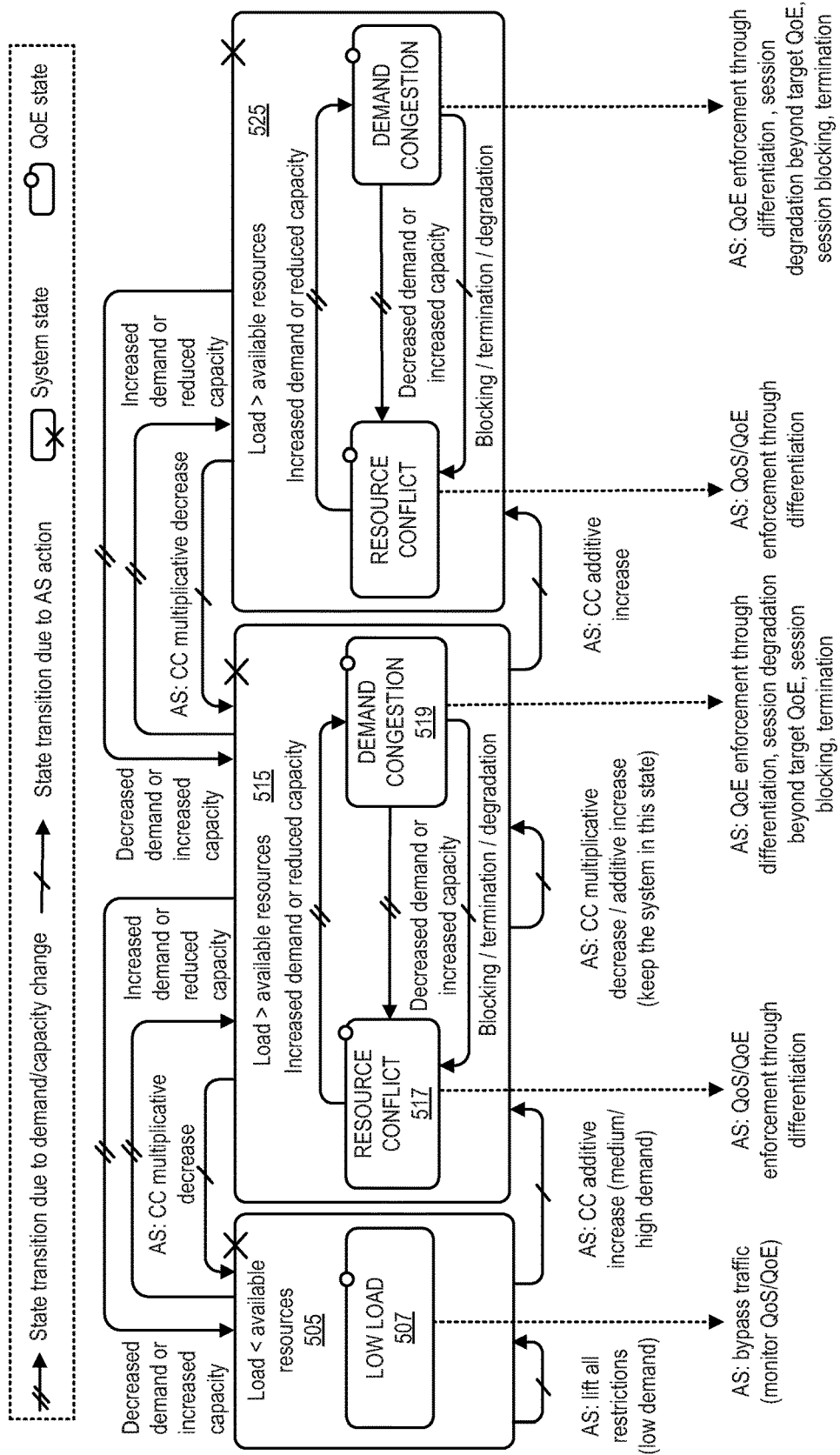
FIG. 5 depicts a state diagram of the application scheduler, in accordance with some example embodiments.

FIG. 5 depicts a state diagram for an application scheduler operation including system status, QoE status, and the corresponding QoS/QoE management and congestion control (CC) actions executed by the application scheduler 300, in accordance with some example embodiments.

The system status may be characterized by the amount of traffic the physical network resources have to handle, and the system status may define the congestion control actions for the application scheduler 300. The objective of the application scheduler 300 congestion control actions may include adjusting the amount of resources redistributed by the application scheduler 300 to the amount of resources available in the system (for example, keeping the application scheduler 300 in control of the resource allocation but efficiently utilizing all available capacity). Rather than letting a system bottleneck (such as a fully loaded radio interface, a fully loaded transport link, and/or the like) shape the amount of bandwidth each competing flow (e.g., traversing through the same bottleneck) gets, the application scheduler itself starts to shape the bandwidth of the traffic so that the cumulative traffic rate does not exceed the bandwidth of the bottleneck resource. This lifts the load from the bottleneck resource/link (resolving the congestion), so that its scheduler (such as the radio scheduler if the bottleneck is the radio interface) will not be loaded and it will not be able to shape the traffic in a non-application and non-QoE aware way. Instead, the control over how the bandwidth is distributed among the competing flows is passed to the application scheduler. The application scheduler may distribute the bandwidth among the flows and application sessions according to QoE level requirements, which provides superior customer experience to what is achieved by the application agnostic QoS level packet schedulers. The QoE status may indicate the relation of the application/flow demand to the available resources in the system, and the QoE status may define the QoS/QoE management actions the application scheduler 300 has to execute.

In the example of FIG. 5, when the application scheduler determines that the system status corresponds to the load being less than (<) available resources 505, this represents an underutilized system having free or available physical resources (for example, radio capacity or transport link capacity) after serving all application sessions or flows. The application scheduler 300 congestion control may not be configured to have a role in this status or state (so the application scheduler 300 may not be configured to limit flows). When that is the case, the QoE status may be LOW LOAD 507 representing that the desired QoS/QoE is provided natively by the system (or any degradation due to external factors that cannot be controlled by the application scheduler 300).

In the example of FIG. 5, when the application scheduler determines that the system status corresponds to the load being about equal ($\approx$) to available resources 515, this represents that system resources (such as radio interface capacity) have become fully utilized by the traffic flows and, as such, application sessions or flows have to compete for these resources. The competition represents the amount of resources each flow or application session is obtaining from the overall available resources (such as the radio capacity or a 5G access point) may not be what the flows/sessions actually need for good QoE (such as a bandwidth higher than the media rate of the multimedia content for a video download) but the resources each flow or application session receives may allocated by the scheduler of the resource (such as the radio scheduler of the radio interface of a 5G access point). Since the radio scheduler or other packet level schedulers are not aware of the amount of resources the applications need, the application sessions may receive less bandwidth (causing QoE degradation) or more bandwidth (unnecessary over-provisioning), leading to suboptimal resource allocation and QoE. This is the point in which the application scheduler 300 may start to actively manage the QoS/QoE through its internal scheduler 320 to enforce at least one desired target (for example, to ensure that each application session gets resources according to its needs). Moreover, status 515 may be considered a target system status that application scheduler's congestion control tries to maintain given sufficient demand to load the system.

At 515, the QoE status determined by the application scheduler may be RESOURCE CONFLICT 517 or DEMAND CONGESTION 519.

The RESOURCE CONFLICT 517 status or state may represent that the cumulative resource demand of the applications or flows passing through a bottleneck resource (such as the radio interface of a 5G access point or a link on the transport network) fits into the available capacity. The sum of the amount of bandwidth needed by each application session may still below the available capacity, so that with proper allocation of the bandwidth among the application session each of them may be given the required amount of resources. The allocation may be performed by the application scheduler as it is aware of the needs of the application sessions. In that state, the application scheduler 300 may enforce the QoS/QoE through differentiation (for example, redistributing the bottleneck resource according to the QoS/QoE requirements). Note that differentiation is not a relative prioritization but the enforcement of explicitly calculated individual per session resource (for example, bandwidth) targets. The differentiation is a method to allocate each application session or flow an amount of resource (e.g., bandwidth) from an available resource pool (such as the radio interface capacity) wherein the allocation is made considering the need of the individual application sessions or flows. Differentiation may be implemented by separately buffering the packets of each application session or flow and scheduling each buffer with an individual target data rate that is defined according to the bandwidth need of the buffered traffic. RESOURCE CONFLICT is the desired QoE status as it allows fulfilling the QoS/QoE targets of all applications/flows.

The DEMAND CONGESTION 519 status or state represents that the cumulative demand of the application sessions or flows passing through a bottleneck resource is higher than the available bottleneck capacity. In that case, not all demands can be satisfied at the same time. Therefore, the application scheduler 300 may manage the QoS/QoE through differentiation and may allow specific sessions to degrade by for example allowing these sessions to receive less resources than what they need or terminate or block sessions. The criteria for selecting the degraded sessions may defined by the policies at the application scheduler.

In the example of FIG. 5, when the application scheduler determines that the system status corresponds to the load being greater than (>) available resources 525, this may represent that the bottleneck resources are heavily overloaded. This may not be a desired state from QoS/QoE management standpoint as it may indicate that the system's native resource managers (for example, the radio scheduler) are enforcing how the resources are distributed among the application sessions/flows. Packets may be buffered at native schedulers (such as the radio scheduler) instead of at the application scheduler. Therefore, the native schedulers may be in a position to enforce their packet level non-application and non-QoE relevant targets, whereas the application scheduler may not be able to (since it is not buffering the packets) enforce its own application and QoE aware targets. Therefore, it is only a transient state that is immediately resolved by the application scheduler 300 congestion control actions. The application scheduler may decrease the data rate it allows towards the rest of the system (for example, towards the radio interface) until the packets start to be buffered at the application scheduler instead of at other locations. Regaining the buffering of the packets gives the application scheduler to enforce its own targets. Meanwhile, the same QoE states and the corresponding QoS/QoE management actions apply as with the previous system state. The transition between the states at FIG. 5 may be triggered by one or more of the following independent processes. First, the demand itself may change as application sessions at user equipment or devices start and/or stop. This may be detected by the application scheduler 300 directly by observing the new application sessions and corresponding flows. Second, the available capacity may change (especially if the resource is a radio interface with varying channel conditions). This may be followed by the application scheduler 300 through congestion control actions by programmatically adjusting the amount of resources it distributes among the sessions. Third, the actions of the application scheduler 300 itself may change the system including the QoE status.

In some example embodiments, the application scheduler's congestion control actions may be configured in accordance with the following. Let C(t) denote the capacity of a given resource as known to the application scheduler 300 (changing with time t) and let T(t) indicate the cumulative throughput as measured by application scheduler 300 over all flows sharing the resource. Assuming that the system starts with a low load, the C(t) is unknown and the application scheduler 300 may initially only monitor the QoS/QoE without acting on the traffic. When demand increases or the capacity is reduced, the available resources in the system may become loaded. This may be detected by the application scheduler 300 through its congestion detection capability. At that point, C(t)=T(t), so the measured throughput over the congested resource gives its momentary capacity. This C(t) may serve for the application scheduler 300 as a starting point for the amount of resources that need to be distributed through its scheduler functionality among the competing sessions. By scheduling the traffic internally, the application scheduler 300 effectively decreases the load in the system. At the same time, C(t) and the amount of resources available in the system may become decoupled as the measured T(t) will be limited by the enforcement targets of the application scheduler 300 itself. Therefore, the application scheduler 300 may continuously (for example, from time to time) need to probe for the resource availability in the system through its additive increase/multiplicative decrease congestion control actions. The additive increase represents an increase C(t) by a given delta Δ amount, which may occur periodically (for example, with a frequency if 1/RTT, where RTT is the measured round-trip time between the application scheduler 300 and the UE). That is, C(t)=C(t-RTT)+Δ. The multiplicative decrease represents a reduction C(t) by an a factor so that C(t)=C(t-RTT)*α.

When the application scheduler 300 detects that the congestion has been resolved (for example, the system load is decreased below the available resources) by its actions, the available system capacity may be higher than C(t). When this is the case, the application scheduler 300 may additively increase C(t) until:

(a) the system bottleneck becomes loaded again due to the increased traffic application scheduler has to process, at which point the measured T(t) throughput again becomes an accurate indicator of the amount of resources the application scheduler 300 needs to redistribute (for example, the system is kept at a given Load that is about equal to the available resources state); or (b) the traffic sources become self-limited and they stop following the C(t) increase with an equal increase in their throughput (i.e., C(t) becomes greater than T(t)) and the system is not loaded; in which case, the system may be considered to have transitioned to the Load less than available resources state and some if not all limitations may be removed (for example, the scheduler transits into bypass mode).

When the application scheduler 300 detects that the QoS/QoE targets are not enforced by its scheduler because it keeps the system loaded too much (for example, Load greater than available resources state 525), the C(t) may be multiplicatively decreased until the application scheduler's 300 scheduler becomes the effective resource distribution enforcement point.

Figure 6:
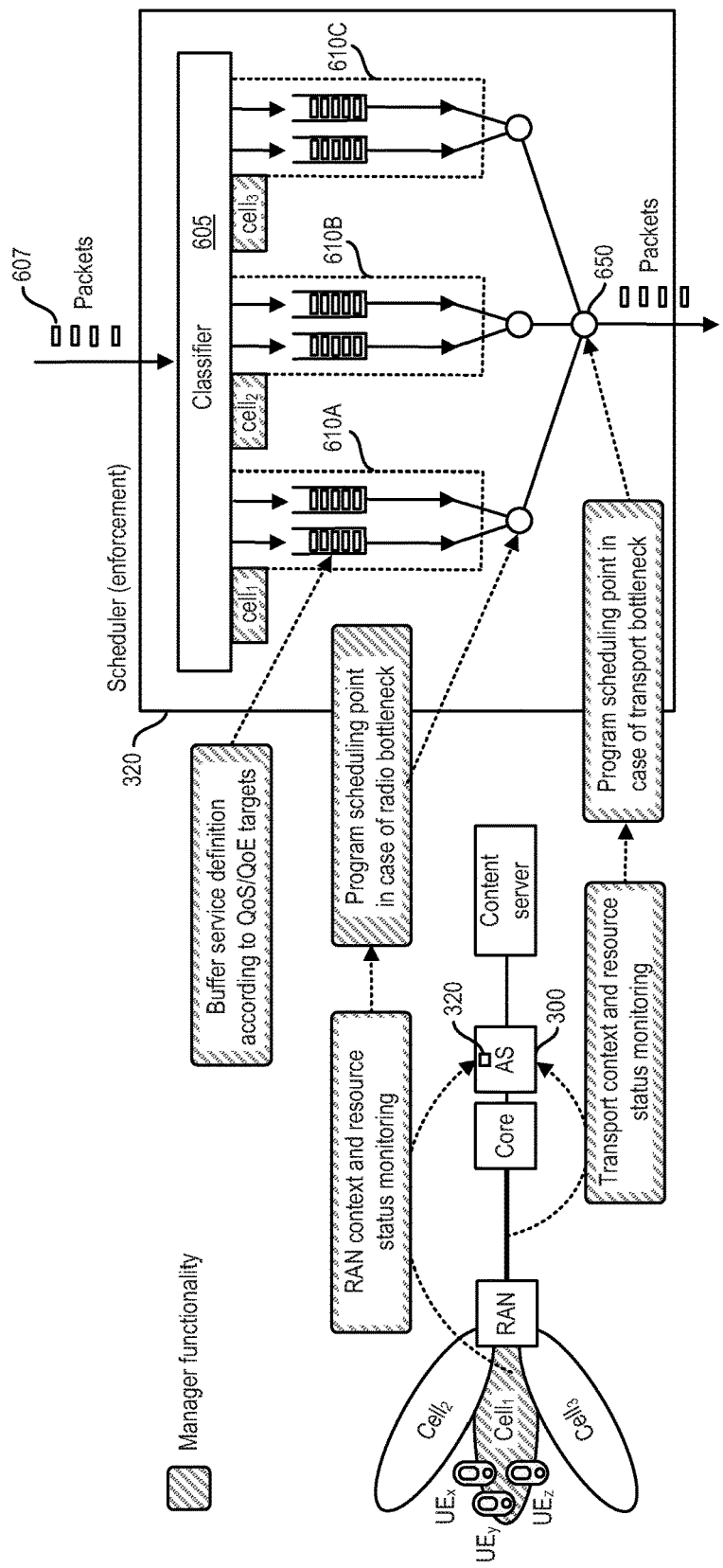
FIG. 6 depicts a system including the application scheduler, in accordance with some example embodiments.

FIG. 6 depicts an example of a system 600 including an application scheduler 300, which further includes scheduler 320, in accordance with some example embodiments. In the example of FIG. 6, the application scheduler 300 is illustrated in the downlink direction with an example network deployment including multiple cells at the radio access network and a core side application scheduler 300 that is (due to its location) capable to manage the QoS/QoE over both radio access network and transport network resources. The scheduler 320 may include a classifier 605 to classify received packets 607 from a downlink, for example.

The application scheduler's scheduler 320 may classify at 605 the traffic flow of packets 607 into dynamically established internal buffers 610A-C that support the enforcement of the QoS or QoE targets defined by the policies and the application, network, and/or user context. The buffers 610A-C may be served by a dynamically programmable hierarchical scheduling infrastructure that is able to flexibly group buffers based on the shared bottleneck point and schedule the traffic according to the service parameters and the available capacity at the bottleneck point.

In the example of FIG. 6, buffers 610A-C may be located at the so-called "leaf" (of upper side of the packet flows), so the packets can be forwarded along a graph mapping to a logical network topology. At each graph node 650, a scheduler's limit can be configured dynamically to represent a shared resource in the network. The scheduler 320 may enforce that the aggregate packet flow logically passing through the graph nodes 650 does not exceed the configured limit. The buffers may be programmed with a service based on the QoS/QoE program executed and the attributes of the traffic mix served from the buffer. For example, when there is a radio bottleneck, the buffers 610A-C may handle traffic served by the radio interface (and thus competing for the same resources) which needs to be scheduled against each other. In case of a transport network bottleneck, the buffers 610A-C sharing the same capacity limited link may require scheduling. Buffers whose traffic experiences no congestion end-to-end may require no scheduling. Therefore, the buffers pass traffic through and only act as an administrative traffic separator to prepare the scheduler for action any time the system/QoE status requires. The behavior may also make the scheduler implementation memory friendly, as it only ever needs to buffer those packets that pass through a bottleneck network resource (and not all packets passing through the application scheduler 300).

Figure 7B:
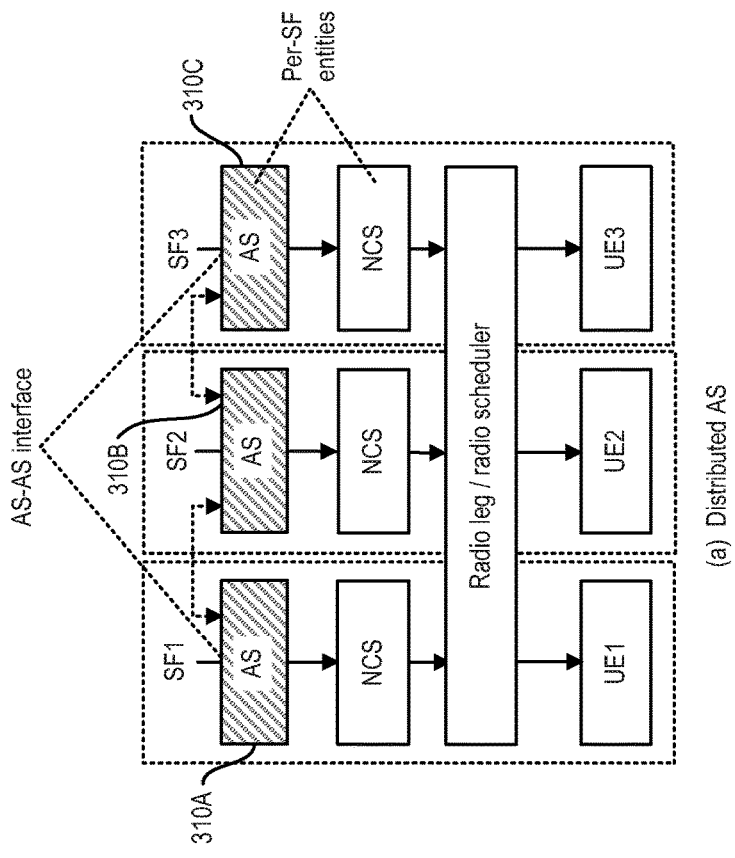
FIG. 7A depicts the application scheduler in a centralized role and FIG. 7B depicts the application scheduler in a distributed role, in accordance with some example embodiments.
Figure 7A:
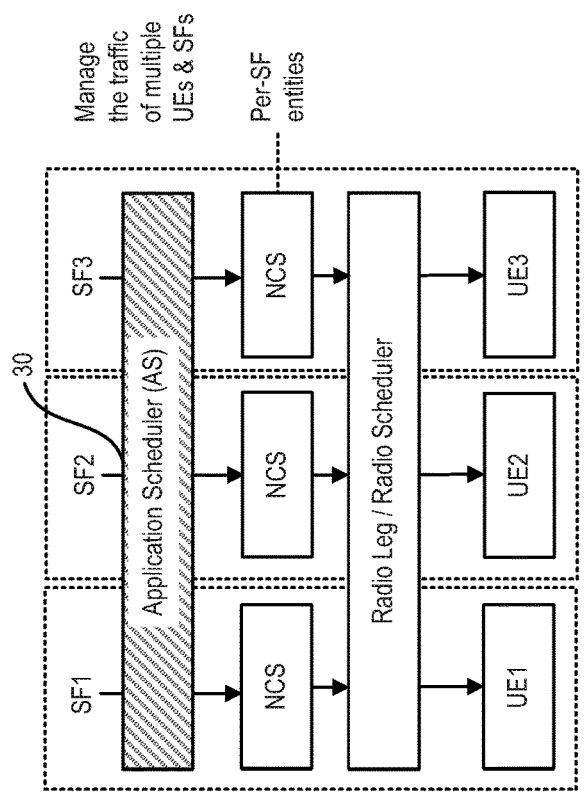

The radio side application scheduler 300 (both in case of radio-only or dual application scheduler 300 deployments) may have access to the user-plane flows at different aggregation levels as shown at FIGS. 7A-7B.

In FIG. 7A, the application scheduler 300 may be configured as a central application scheduler. When this is the case, the central application scheduler 300 may handle the traffic of multiple service flows (for example, the entire traffic served by a given access point or by multiple access points in case of C-RAN deployment). In the example of FIG. 7A, the application scheduler 300 may jointly optimize and enforce the QoS/QoE for multiple users, including the differentiation among applications run by different user equipment. The application scheduler 300 may perform centralized radio status monitoring based on measurements taken from the aggregate traffic of the radio leg. This may enable the application scheduler 300 to use and correlate measurements taken from each individual flow. The application scheduler 300 congestion detection function may operate on measurements such as end-to-end and radio side RTT, delay distribution, discard detection, and/or discard pattern profiling, TCP data/ACK correlation and pattern profiling, and/or other operations. Once resource conflict or demand congestion is detected, the available radio capacity may be configured by manager 310 (FIG. 3A) into the scheduler 320 (FIG. 3A) as the momentary aggregate scheduling rate of all traffic towards the radio interface. Therefore, QoS/QoE may be managed through a logically centralized scheduling of all traffic towards the same radio leg, where each session gets a share from the total available capacity according to its needs, maximizing the number of sessions served well and at the same time maintaining fully utilized radio. As a result, the radio resources may be better utilized through the application scheduler 300.

In FIG. 7B, the application scheduler 300 is configured as a distributed application scheduler 300A-C. When this is the case, each application scheduler 300A-C instance may handle only the traffic of one particular service flow. In the example of FIG. 7B, the application schedulers 300A-C may be merged (for example, logically merged) into the NCS (network convergence sublayer of layer 2). However, the application scheduler may require an application scheduler-to-application scheduler interface between application scheduler instances 300A-C handling service flows that are served by the same radio leg. The distributed application scheduler 300A-C may perform distributed system status (for example, congestion) detection and may execute individual actions as it has access only to service flow level traffic and measurements. However, the individual application scheduler 300 measurements may still be implicitly coupled as their traffic is served by the same radio leg (for example, via a shared resource). As each application scheduler instance handles traffic that is served by the same resource, the application scheduler may approximately observe the same packet level measurements over the radio interface (such as similar round-trip times between the application scheduler and the user equipment and similar round-trip time distribution attributes such as the skewness of the round-trip time measurements). Therefore, each instance 300A-C may detect congestion caused by radio interface bottleneck approximately at the same time. Each application scheduler 300A-C at FIG. 7B may execute the same program upon detecting the same system status, which may harmonize their effect on the overall traffic mix. When there is congestion, the application scheduler 300A-C instances handling application or traffic with lower priority (for example, best effort) or less throughput sensitivity (for example, web browsing sessions with graceful degradation on resource shortage) may start acting by gradually decreasing the scheduling rate of their own traffic. An application scheduler with applications that would break in case the throughput drops below a session specific target (for example, the media rate of the streaming video) may keep their scheduling rate intact longer at the level required by the application session targets, hoping that other application scheduler instances exist that backpressure their traffic first. When the traffic mix of a service flow includes flows/sessions with different QoS/QoE targets, the application scheduler 300 may enforce the proper differentiation among them (within the service flow) by way of multiple buffers that may be scheduled differently. In an optimal case, the self-reduction of low priority traffic may be able to alleviate the load on the radio leg before the service level of important applications needs to be decreased. Therefore, the distributed application scheduler 300 instances may keep the QoS/QoE maximized through their individual actions.

In the example of FIG. 7B, implementing an application scheduler-to-application scheduler interface to exchange congestion detection and resource profiling information (for example, measured throughput per application scheduler 300 between the application scheduler 300 instances) may help improve the overall QoS/QoE management efficiency as the application scheduler 300 instances can act on the same common information/knowledge (even through their user-plane action may still be performed individually). The interworking may enable the application scheduler 300 (which is controlling best effort traffic) to start to decrease the amount of data it forwards to the radio interface based on QoS/QoE degradation detected by an application scheduler 300 handling for example an important application. When application scheduler 300 instances exchange the QoS/QoE targets and priorities of their traffic mix, the amount of traffic reduction at each application scheduler 300, which may be required to resolve congestion, may be calculated explicitly and enforced in a single step. When the application scheduler 300 instances receive feedback from the radio (as further described below with respect to the interworking examples), there may not be a need to implement the application scheduler-to-application scheduler interface as each application scheduler 300 instance may obtain the required insight/information directly from a radio interface.

The following provides additional example embodiments related to interworking with a radio scheduler. In implementations including dual application scheduler 410A-B deployment, the core side application scheduler 410B may be configured to have the scope of enforcing QoS/QoE on the transport network and thus the core side application scheduler 410B may not interwork with the radio scheduler.

When there is no interworking being implemented with a radio scheduler, the application scheduler may override native operation and resource scheduling targets (for example, proportional fair, PF) of the radio scheduler in order to achieve a different kind of resource distribution among the competing application sessions when needed. For example, the application scheduler 300 may take over most of the packet buffering from the radio layers (where they are served according to the radio principles) to its internal per-session buffers (where they are scheduled towards the radio according to the QoS/QoE principles).

When there is no interworking with the radio, the application scheduler 300 may profile the radio interface using for example user-plane measurements and analytics to detect radio interface congestion and, in congestion cases, obtain the momentarily available capacity (note that this varies in real time due to radio channel fluctuations and user mobility, thus it may be continuously updated by the application scheduler 300). Moreover, the application scheduler 300 may keep track of the sessions served by the same radio interface (the information is available as the application scheduler 300, being part of the enforcement point, may be aware of which service flows are currently served by each radio interface). In the radio congestion case, the application scheduler 300 may start scheduling the packets from its internal application session buffers towards the radio interface to control the data availability in the radio buffers corresponding to different service flows (SFs), sub-service flows (SSFs), and/or aggregates of application sessions. Controlling the data availability has a dual target in the sense that the control may seek to maximize both the QoE and the resource utilization. This dual target may be sought via the following application scheduler 300 actions/operations:

Limit the freedom of the radio scheduler in selecting which radio buffers are scheduled (i.e., allowed access to the radio resources) or which packets are available at the radio buffers. As only radio buffers with data are considered for radio scheduling, and only up to the data available in the radio stack, the application scheduler 300 can enforce that radio buffers serving applications having higher resource demand are scheduled more often than others requiring less resources. This target enables to enforce the QoE of the application sessions, i.e., maximize the QoE.

Make sure that the radio scheduler has still enough data cumulatively (considering all radio buffers) in each transmission time interval to fully allocate the available radio resources (for example, number of PRBs per transmission time interval). This target enables to maximize the resource utilization.

Application scheduler 300 may enforce relative priorities or other QoS policies among sessions and implement QoE driven service (for example, given amount of bandwidth, latency requirements, and/or the like) needed for QoE enhancement or maximization. At the same time, the application scheduler 300 may maintain the radio fully loaded with respect to traffic to enhance or maximize resource utilization as well.

Within the radio scheduling constraints implicitly created by the application scheduler 300, the radio scheduler may have the freedom to perform the radio resource allocation (for example, assign PRBs) to the radio buffers having data in a given transmission time interval (transmission time interval), letting the radio scheduler enforce its own (for example, proportional fair) targets and maximize channel diversity gains as much as possible given the constraint of enforcing QoS/QoE.

Figure 8:
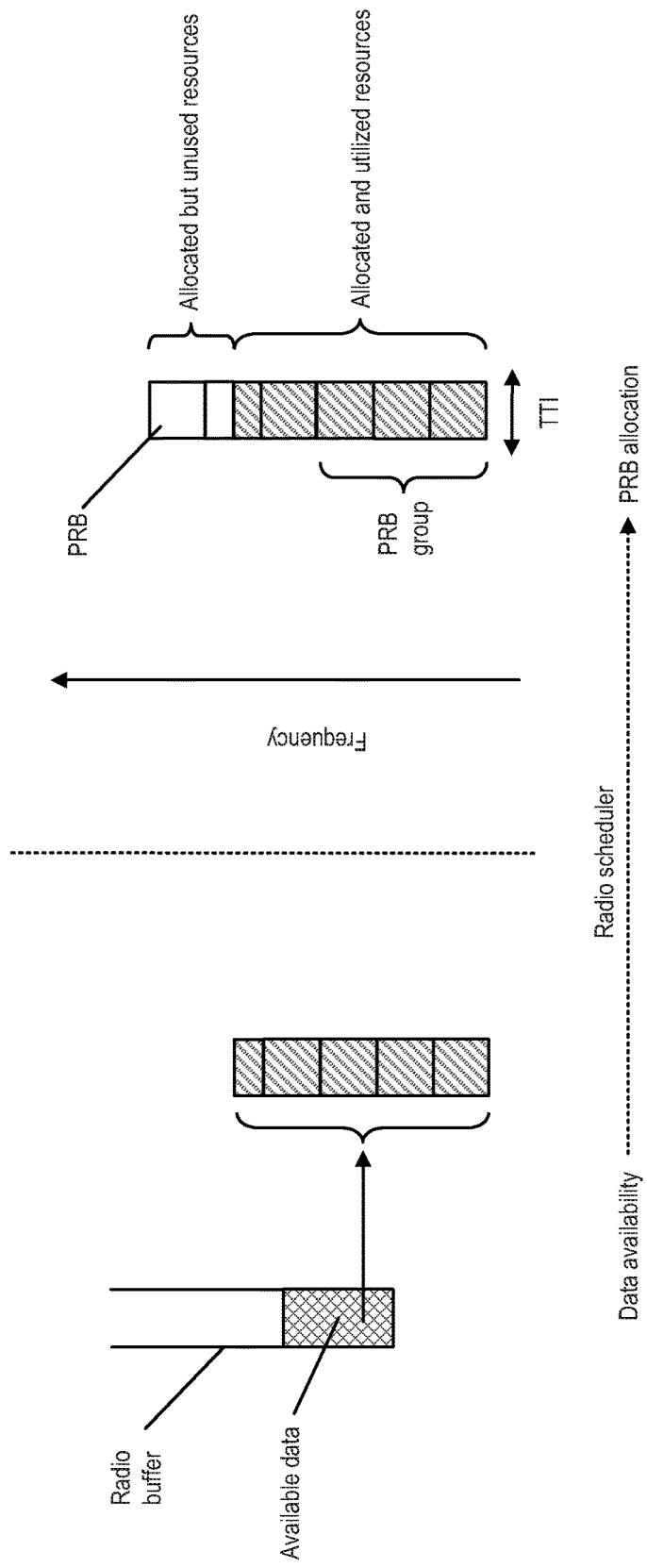
FIG. 8 depicts inefficiencies caused by radio buffer depletion, in accordance with some example embodiments.
Figure 9:
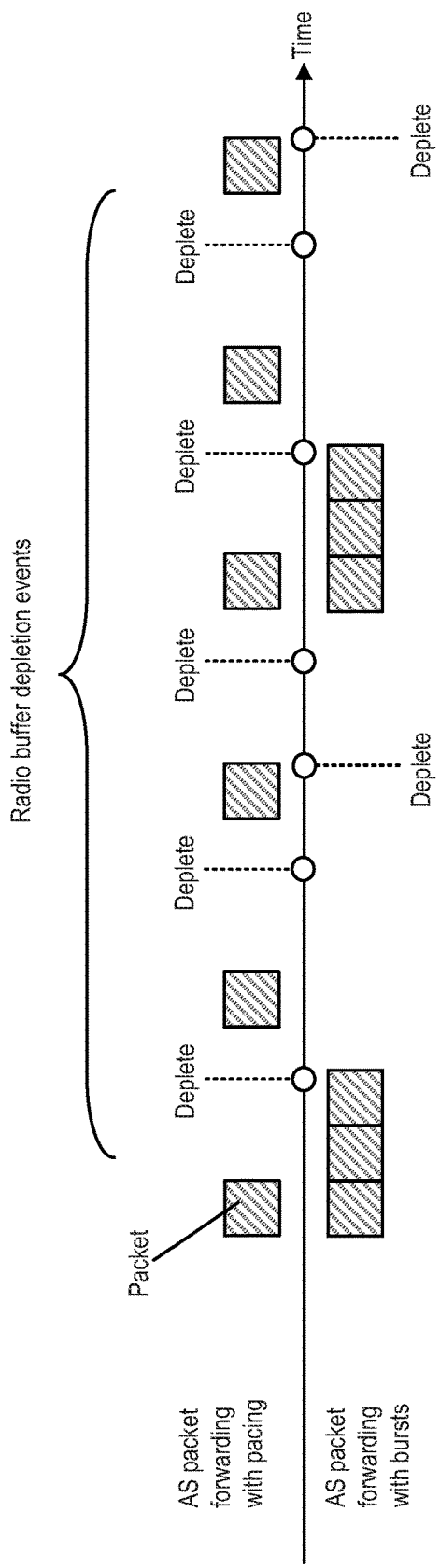
FIG. 9 depicts bursty packet forwarding, in accordance with some example embodiments.

In order to enforce that specific radio buffers are scheduled significantly more than others (for example, in case the corresponding application sessions have highly different resource requirements compared to the native service that the radio scheduler would provide), the application scheduler 300 may temporarily deplete a radio buffer (for example, by stop forwarding traffic to it until it empties) so that the radio scheduler has no choice but to skip it during the scheduling rounds (even if its internal scheduling exponents or targets would mandate that the buffer is scheduled immediately). In some (if not every) transmission time interval when a radio buffer goes empty, this creates a loss of radio resource allocation efficiency due to the granularity of the physical resource block allocation. The radio scheduler may allocate at least one, but often more than one (for example, a group) of PRBs to a given radio buffer once it was selected to be serviced in a given transmission time interval. The physical resource block (or group of physical resource blocks) assigned to the radio buffer may define a quantity of useful bits that can be potentially transmitted using the physical resource block's resources (based on the modulation and coding scheme currently effective for the user equipment). If the radio buffer has less data than that, there can be assigned but unused radio resources (that cannot be redistributed to other radio buffers due to the scheduler allocation granularity), which may result in resource utilization loss as depicted at FIG. 8. This loss may be mitigated by at least reducing the occasions when a radio buffer is depleted due to the application scheduler 300 operation. A technique to achieve this may be to forward packets from the application scheduler 300 internal buffers in bursts (multiple packets) instead of transmitting one packet at a time as shown at FIG. 9. The burst may ensure that the radio buffer is kept loaded during multiple transmission time intervals, which may reduce the efficiency loss, whereas the average service (over multiple transmission time intervals) can still be enforced by the application scheduler 300 to be in-line with the resources required by the application sessions. Bursting packets may only be available when the corresponding application has sent sufficient data. Moreover, depleting a radio buffer (and its associated efficiency loss) may occur irrespective of the application scheduler 300 (for example, each time an application stops sending more data). As such, the application scheduler 300 may attempt to mitigate the radio buffer depletions that are the consequence of its QoS/QoE enforcement.

Figure 10:
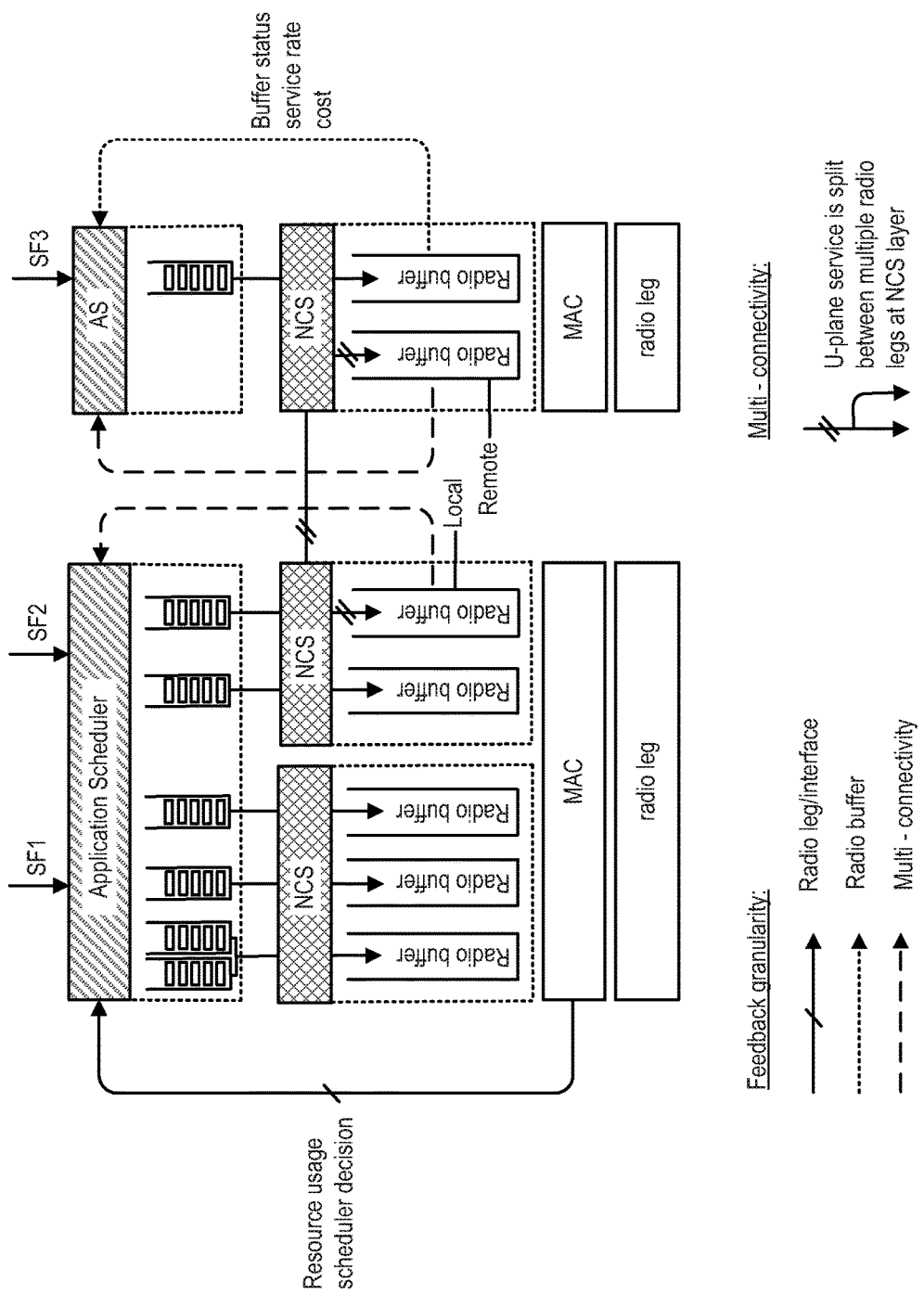
FIG. 10 depicts feedback from the radio layer to the application scheduler in accordance with some example embodiments.

In some example embodiments, there may be provide interworking between the radio side application scheduler 300 and the radio scheduler 322. This interworking may include the radio scheduler providing feedback to the application scheduler 300 as shown at the example of FIG. 10. When this is the case, an interface from the radio scheduler to the application scheduler 300 may be provided. The feedback may include information about the cumulative radio leg and/or interface (for example, physical radio resource utilization that affects all traffic served by the interface) and information regarding each individual radio buffer (for example, buffer load or radio channel quality). Moreover, the radio stack may provide feedback about multi-connectivity (for example, scenarios when the traffic of a service flow is split among multiple radio legs on the NCS layer).

Regarding the feedback on the radio leg and/or interface level, physical radio resource utilization (for example, a quantity/number or percent of physical resource blocks scheduled) may be provided as feedback. This may enable the application scheduler 300 to decide if the radio resources are fully utilized and thus whether the radio scheduler is enforcing its own targets or the measured QoS/QoE is due to external limitations (for example, UE/server side). With respect to the radio scheduler decisions (for example, list of radio buffers that were selected in a scheduling round), this may enable the application scheduler 300 to harmonize its internal operation with that of the radio scheduler (for example, forward packets to the radio in the same pattern as the radio schedules the corresponding radio buffers).

With respect to feedback on individual radio buffer level (which may be provided separately for each radio buffer to the application scheduler 300 that forwards traffic to the radio buffer), the buffer status (for example, number of bytes waiting for transmission) may be provided. This buffer status feedback information may enable the application scheduler 300 to anticipate when the buffer is to be depleted (which would affect how the corresponding packets get scheduling time) and schedule packet bursts (in order to reduce inefficiency due to depleting radio buffer). Moreover, the feedback information may include service rate (the rate at which data is transmitted from the radio buffer to the UE over the air interface) and/or cost of serving the buffer's data over the corresponding UE's radio channel. The cost of serving feedback may represent the amount of physical radio resources required to transmit a given amount of traffic (for example, physical resource block/bit). This may enable the application scheduler 300 to identify those application sessions whose service according to their QoE requirements need relatively large amount of resources (due to the poor individual channel quality and low coding and modulation order that are represented as high cost, for example). For such application sessions, the QoE targets may be relaxed (for example, increase the web page download time target) or they may be put to best effort service to avoid that QoE enforcement takes away too much radio resources. Such behavior may be in-line with the proportional fair algorithm logic applied by most radio resources on the physical resource block level. Such decisions may be made according to the QoS/QoE policies (if provided with such scope) or according to the pre-configured default behavior.

The feedback may also include multi-connectivity information. This multi-connectivity information may indicate if the traffic of a given sub-flow or sub-service flow (received from the application scheduler 300) is being served by for example two (or more) radio buffers, one at the local radio leg/interface (whose traffic is, partly or fully, handled by the application scheduler 300) and one (or more) by remote radio leg/interface whose traffic may not be visible to the application scheduler 300 (depending on the application scheduler 300 deployment). This multi-connectivity information indication may enable the application scheduler 300 to account for the measured performance in terms of radio interface resources (for example, the measured throughput of the application session subject of multi-connectivity is not fully served by the local radio leg) as well as know if the cumulatively available application level throughput is less than the amount of throughput that it can measure on the application scheduler 300 level. The multi-connectivity feedback information may also include radio buffer level information for the remote radio buffer(s) and/or information on "guest" radio buffers whose traffic is forwarded from another NCS to the radio leg supervised by the application scheduler 300.

When the application scheduler 300 is able to directly change the radio scheduler operation or internal parameters based on application and QoE insight, there may be an interface from the application scheduler 300 towards the radio scheduler. The scope of the dynamic scheduler parameter update by the application scheduler 300 may provide movement to the radio scheduler's native resource allocation scheme closer to the demand of the application sessions, without having to integrate full application and QoE awareness into an inherently radio centric resource scheduler. The scheduler parameters that the application scheduler 300 may change include a per buffer scheduling weight and/or a per buffer scheduler metric.

Regarding the per buffer scheduling weight, the scheduler 320 may implement a weighted queuing scheme where each radio buffer gets a service proportional to a pre-configured relative weight. When this is the case, adjusting the weight on a radio buffer level may enable the radio scheduler to natively allocate more or less resources to a given set of flows (that, in turn, results in more or less throughput).

With respect to the per buffer scheduler metric, the radio scheduler 322 may compute a metric for each buffer at each transmission time interval. The metric may be calculated based on different terms, such as the scheduling discipline (for example, RR, PF), achieved service rate/throughput, the amount of time (transmission time intervals) since the buffer has been scheduled, the data availability in the radio buffer, delay target of the buffer, and/or the like. The different terms may be presented as dynamically calculated values that are for example combined or multiplied together to get a momentary priority of the buffer. The priority may be used by the application scheduler 300 to rank the buffers, when the scheduler selects a limited number of them that are granted access to radio resources within a given transmission time interval. As a native extension to this mechanism, the scheduling priority of a given radio buffer may be increased or decreased based on application insight (by introducing another multiplicative term that is externally adjustable by the application scheduler 300). This may be configured into the existing scheduler logic while enabling external control on the scheduler behavior.

Without in any way limiting the scope, interpretation, or application of the claims appearing herein, a technical effect of one or more of the example embodiments disclosed herein may include enhanced QoE and QoS for services and/or applications. Moreover, without in any way limiting the scope, interpretation, or application of the claims appearing herein, a technical effect of one or more of the example embodiments disclosed herein may include enhanced congestion control based on QoE and QoS monitoring.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (application scheduler 300IC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any non-transitory computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. An apparatus comprising:
at least one processor and at least one memory including computer program code, the at least one memory and computer program code configured to, with the at least one processor, cause the apparatus to at least:
monitor user plane traffic for a start of an application session;
instantiate a buffer for a detected application session;
configure at least one service parameter at the buffer in accordance with a quality of service parameter or a quality of experience parameter; and
correlate uplink and downlink user plane traffic to enforce scheduling at the buffer in accordance with the quality of service parameter or the quality of experience parameter.

2. The apparatus of claim 1, wherein the buffer provides additional buffering for a detected bottleneck at another network node.

3. The apparatus of claim 1, wherein the apparatus is further caused to at least:
provide congestion control by increasing or decreasing a rate of a scheduler comprising the buffer.

4. The apparatus of claim 3, wherein the increase is an additive increase.

5. The apparatus of claim 3, wherein the decrease is a multiplicative decrease.

6. The apparatus of claim 1, wherein the apparatus comprises, or is comprised in, an application scheduler.

7. A method comprising:
monitoring, by an application scheduler, user plane traffic for a start of an application session;
instantiating, by the application scheduler, a buffer for a detected application session;
configuring, by the application scheduler, at least one service parameter at the buffer in accordance with a quality of service parameter or a quality of experience parameter; and
correlating, by the application scheduler, uplink and downlink user plane traffic to enforce scheduling at the buffer in accordance with the quality of service parameter or the quality of experience parameter.

8. The method of claim 7, wherein the buffer provides additional buffering for a detected bottleneck at another network node.

9. The method of claim 7 further comprising:
controlling, by the application scheduler, congestion by increasing or decreasing a rate of a scheduler comprising the buffer.

10. The method of claim 9, wherein the increase is an additive increase.

11. The method of claim 9, wherein the decrease is a multiplicative decrease.

12. A non-transitory computer-readable storage medium including program code which, when executed by at least one processor, causes operations comprising:
monitoring, by an application scheduler, user plane traffic for a start of an application session;
instantiating, by the application scheduler, a buffer for a detected application session;
configuring, by the application scheduler, at least one service parameter at the buffer in accordance with a quality of service parameter or a quality of experience parameter; and
correlating, by the application scheduler, uplink and downlink user plane traffic to enforce scheduling at the buffer in accordance with the quality of service parameter or the quality of experience parameter.

13. The non-transitory computer-readable storage medium of claim 12, wherein the buffer provides additional buffering for a detected bottleneck at another network node.

14. The non-transitory computer-readable storage medium of claim 12 further comprising:
controlling, by the application scheduler, congestion by increasing or decreasing a rate of a scheduler comprising the buffer.

15. The non-transitory computer-readable storage medium of claim 14, wherein the increase is an additive increase.

16. The non-transitory computer-readable storage medium of claim 14, wherein the decrease is a multiplicative decrease.

* * * * *